US010382231B2

(12) United States Patent
van Houtum

(10) Patent No.: US 10,382,231 B2
(45) Date of Patent: Aug. 13, 2019

(54) RECEIVER CIRCUIT

(71) Applicant: NXP B.V.

(72) Inventor: Wim van Houtum, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/641,881

(22) Filed: Jul. 5, 2017

(65) Prior Publication Data
US 2018/0034670 A1 Feb. 1, 2018

(30) Foreign Application Priority Data

Jul. 29, 2016 (EP) ..................................... 16181879

(51) Int. Cl.
| H04L 25/02 | (2006.01) |
| H04L 5/00 | (2006.01) |
| H04B 17/309 | (2015.01) |
| H04L 27/26 | (2006.01) |
| H04L 1/00 | (2006.01) |

(52) U.S. Cl.
CPC ....... *H04L 25/0204* (2013.01); *H04B 17/309* (2015.01); *H04L 5/0057* (2013.01); *H04L 25/022* (2013.01); *H04L 25/0228* (2013.01); *H04L 25/0232* (2013.01); *H04L 25/0258* (2013.01); *H04L 27/2607* (2013.01); *H04L 27/2647* (2013.01); *H04L 27/2649* (2013.01); *H04L 1/0054* (2013.01)

(58) Field of Classification Search
USPC ....................................................... 375/227
See application file for complete search history.

(56) References Cited

U.S. PATENT DOCUMENTS

| 6,128,355 A | 10/2000 | Backman et al. |
| 6,167,039 A | 12/2000 | Karlsson et al. |
| 6,259,893 B1 | 7/2001 | Kroeger et al. |
| 6,671,340 B1 | 12/2003 | Kroeger et al. |
| 8,416,118 B1 * | 4/2013 | Nuthalapati .............. G01S 7/36 |
| | | 342/13 |

(Continued)

FOREIGN PATENT DOCUMENTS

| EP | 3197058 A1 | 7/2017 |
| EP | 3 244 550 A1 | 11/2017 |

OTHER PUBLICATIONS

IBIQiBiquity Digital Corporation, HD Radio™ Air Interface Design Description Layer 1 FM, Rev. G. 133 pgs. (Aug. 23, 2011).

(Continued)

*Primary Examiner* — David C Payne
*Assistant Examiner* — Sarah Hassan
(74) *Attorney, Agent, or Firm* — Rajeev Madnawat

(57) ABSTRACT

A receiver circuit comprising an averaging-processing-block that is configured to receive an OFDM signal. The OFDM signal comprises a plurality of sample-values, wherein the sample-values comprise: a middle-sample-value; a lower-sample-value-group; and a higher-sample-value-group. The averaging-processing-block can determine an averaged-sample-value for the middle-sample-value by performing an averaging operation on the sample-values of the lower-sample-value-group and the higher-sample-value-group, but not on the middle-sample-value.

17 Claims, 3 Drawing Sheets

(56) References Cited

U.S. PATENT DOCUMENTS

| | | |
|---|---|---|
| 2003/0053412 A1* | 3/2003 | Yoshida .............. H04L 27/2647 370/208 |
| 2005/0135324 A1 | 6/2005 | Kim et al. |
| 2008/0056343 A1* | 3/2008 | Rajagopal ......... H04L 25/03006 375/232 |
| 2012/0033751 A1* | 2/2012 | Sathananthan ....... H04L 25/022 375/260 |
| 2012/0114031 A1 | 5/2012 | Li et al. |
| 2012/0134435 A1 | 5/2012 | Kapoor et al. |
| 2013/0308717 A1 | 11/2013 | Maltsev et al. |
| 2014/0056378 A1 | 2/2014 | Harel et al. |
| 2014/0153625 A1 | 6/2014 | Vojcic et al. |
| 2016/0134337 A1 | 5/2016 | Branlund |
| 2016/0142119 A1 | 5/2016 | Van Houtum |
| 2016/0204810 A1 | 7/2016 | Murrin |
| 2017/0214499 A1 | 7/2017 | van Houtum |
| 2017/0331545 A1 | 11/2017 | van Houtum et al. |

OTHER PUBLICATIONS

National Radio Systems Committee, "NRSC-5-C In-band/on-channel Digital Radio Broadcasting Standard", 53 pgs. (Sep. 2011).
Notice of Allowance dated Apr. 19, 2018 for U.S. Appl. No. 15/649,986, 9 pages.
Non-Final Office Action dated Feb. 6, 2018 for U.S. Appl. No. 15/649,986 8 pages.

* cited by examiner

RECEIVER CIRCUIT

CROSS-REFERENCE TO RELATED APPLICATIONS

This application claims the priority under 35 U.S.C. § 119 of European Patent application no. 16181879.4, filed on Jul. 29, 2016, the contents of which are incorporated by reference herein.

The present disclosure relates to receiver circuits, including receiver circuits that can determine averaged-sample-values.

According to a first aspect of the present disclosure there is provided a receiver circuit comprising:
an averaging-processing-block configured to:
  receive an OFDM signal that comprises a plurality of sample-values, wherein the sample-values comprise:
    a middle-sample-value;
    a lower-sample-value-group; and
    a higher-sample-value-group; and
  determine an averaged-sample-value for the middle-sample-value by performing an averaging operation on the sample-values of the lower-sample-value-group and the higher-sample-value-group, but not on the middle-sample-value.

In one or more embodiments the sample values comprise: (i) channel-estimate-sample-values that are representative of an estimate for the transfer function of the channel for each received sample, or (ii) noise-estimate-sample-values that are representative of an estimate for a noise signal that is present in each sample.

In one or more embodiments the middle-sample-value corresponds to a known pilot-sample-value.

In one or more embodiments the averaging-processing-block comprises:
a channel-averaging-processing-block configured to:
  receive an OFDM signal that comprises a plurality of channel-estimate-sample-values, wherein the channel-estimate-sample-values comprise:
    a middle-channel-estimate-sample;
    a lower-channel-estimate-sample-group; and
    a higher-channel-estimate-sample-group; and
  determine an averaged-channel-estimate-sample-value for the middle-channel-estimate-sample by performing an averaging operation on the sample-values of the lower-channel-estimate-sample-group and the higher-channel-estimate-sample-group, but not on the sample-value of the middle-channel-estimate-sample, wherein the averaged-channel-estimate-sample-value is representative of channel-estimation-data.

In one or more embodiments the receiver circuit further comprises:
a linear-interpolator configured to interpolate between a plurality of averaged-channel-estimate-sample-values in order to determine the channel-estimation-data.

In one or more embodiments the receiver circuit further comprises:
a channel-estimator configured to:
  receive an OFDM signal that comprises a plurality of reference-sample-values;
  receive an OFDM signal that comprises a plurality of pilot-sample-values, wherein the pilot-sample-values correspond to the received reference-sample-values; and
  process the pilot-sample-values and the received reference-sample-values in order to determine the plurality of channel-estimate-sample-values.

In one or more embodiments the averaging-processing-block comprises:
a noise-averaging-processing-block configured to:
  receive an OFDM signal that comprises a plurality of noise-estimate-sample-values, wherein the noise-estimate-sample-values comprise:
    a middle-noise-estimate-sample;
    a lower-noise-estimate-sample-group; and
    a higher-noise-estimate-sample-group; and
  determine an averaged-noise-estimate-sample for the middle-noise-estimate-sample by performing an averaging operation on the sample-values of the lower-noise-estimate-sample-group and the higher-noise-estimate-sample-group, but not on the sample-value of the middle-noise-estimate-sample.

In one or more embodiments the receiver circuit further comprises:
a virtual-pilot-signal-generator configured to:
  receive channel-estimation-data;
  receive an OFDM signal that comprises a plurality of data-sample-values; and
  divide the plurality of data-sample-values by the channel-estimation-data in order to determine a plurality of channel-estimated-data-sample-values.

In one or more embodiments the receiver circuit further comprises:
a noise-estimator configured to:
  receive the channel-estimation-data;
  receive the plurality of channel-estimated-data-sample-values;
  receive the OFDM signal that comprises the plurality of data-sample-values; and
  process the channel-estimation-data, the plurality of channel-estimated-data-sample-values, and the OFDM signal that comprises the plurality of data-sample-values in order to determine the plurality of noise-estimate-sample-values for the noise-averaging-processing-block.

In one or more embodiments the virtual-pilot-signal-generator is configured to divide the plurality of data-sample-values by the channel-estimation-data, and then optionally convert the results of the division to the nearest one of a plurality of predetermined points of an associated shift keying map in order to determine the plurality of channel-estimated-data-sample-values.

In one or more embodiments the receiver circuit further comprises:
an overlap-and-add-processor configured to:
  receive an input-OFDM-signal comprising a plurality of time-domain-samples;
  determine a centre-of-mass of the plurality of time-domain-samples;
  perform an overlap-and-add operation on the input-OFDM-signal based on the determined centre-of-mass in order to provide a processed-OFDM-signal comprising a plurality of processed-time-domain-samples.

In one or more embodiments the receiver circuit further comprises:
a domain-converter configured to convert the processed-time-domain-samples into: (a) the plurality of reference-sample-values; and (b) the plurality of data-sample-values in the frequency domain.

In one or more embodiments the overlap-and-add-processor is configured to perform an overlap-and-add operation by:
setting an OaA-cut-off based on the determined centre-of-mass, which defines a boundary within guard samples between: (i) a first set of guard samples; and (ii) a second set of guard samples;
copying the sample-values of the first set of guard samples to the sample-values of the second set of guard samples.

In one or more embodiments the receiver circuit further comprises a CSI-estimator configured to process the averaged-channel-estimate-sample-value and the averaged-noise-estimate-sample in order to determine channel-state information.

In one or more embodiments the receiver circuit further comprises an LLR-calculator configured to:
process the channel-state information, the averaged-channel-estimate-sample-value and data-sample-values in order to determine an output-LLR-signal.

There may be provided a method of processing an OFDM signal, wherein the OFDM signal comprises a plurality of sample-values, wherein the sample-values comprise: a middle-sample-value; a lower-sample-value-group; and a higher-sample-value-group, the method comprising:
determining an averaged-sample-value for the middle-sample-value by performing an averaging operation on the sample-values of the lower-sample-value-group and the higher-sample-value-group, but not on the middle-sample-value There may be provided a car radio receiver system comprising any receiver circuit disclosed herein, or configured to perform any method disclosed herein.

There may be provided an integrated circuit or electronic device comprising any circuit or system disclosed herein.

There may be provided a computer program, which when run on a computer, causes the computer to configure any apparatus, including a circuit, controller, or device disclosed herein or perform any method disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

The in-band on-channel (IBOC) digital radio broadcasting standard for the FM-band is defined by the FM-part of the "In-band/on-channel Digital Radio Broadcasting Standard" document published by National Radio Systems Committee (NRSC). This document is also the basis for the transmitted IBOC-signals that can be received by an HD Radio™ certified receiver. The HD Radio™ transmissions are also based on "HD Radio™ Air Interface Design Description Layer 1 FM", Doc. No.: SY_IDD_1011sG Rev. G, Aug. 23, 2011.

Figure 1:
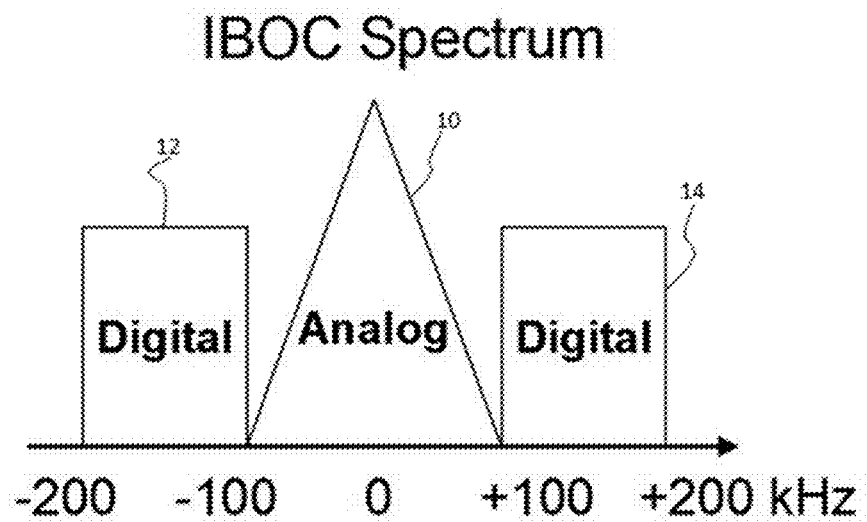
FIG. 1 shows a simplified form of one type of IBOC signal.

FIG. 1 shows a simplified form of one type of IBOC signal, which is the so-called "Hybrid IBOC FM" signal, and is denoted "Hybrid IBOC" in this document. Frequency is shown on the horizontal axis, with 0 Hz representing the carrier frequency. The vertical dimension of FIG. 1 represents power.

The hybrid signal is a combination/addition of an analogue FM-signal 10 and a digitally-modulated signal 12, 14. The analogue FM-signal 10 occupies a bandwidth of 200 kHz, which is between −100 kHz and 100 kHz, and represents a central-part that is centred on the carrier frequency. The digitally-modulated signal 12, 14 occupies a bandwidth of roughly 200 kHz. However, the digitally-modulated signal is separated into a lower-sideband 12 and an upper-sideband 14, each with a bandwidth of roughly 100 kHz. The lower-sideband is spectrally positioned at a distance of 100 kHz below the carrier-frequency. The upper-sideband 14 is spectrally positioned at a distance of 100 kHz above the carrier-frequency. In this way, the lower-sideband 12 is below the lowest frequency of the central-part, and the upper-sideband 14 is above the highest frequency of the central-part. The digitally-modulated signal 12, 14 can use orthogonal frequency division multiplexing (OFDM), where the number of subcarriers can vary depending on the selected service/transmission-mode.

The total power of the digitally-modulated signal 12, 14 can be approximately a factor of a hundred smaller than the power of the analogue host-FM-signal 10. The hybrid IBOC signal can therefore be considered as a noisy FM-signal.

A so-called "channel-grid" defines a reserved channel-bandwidth for an analogue FM-signal. The channel bandwidth in Band-II is 200 kHz by regulation, as shown by the analogue central part 10 in FIG. 1. As a consequence, the lower and upper digital OFDM-sidebands 12, 14 can correspond to the frequency range of 1st adjacent lower and upper neighbouring FM-channels.

Figure 2:
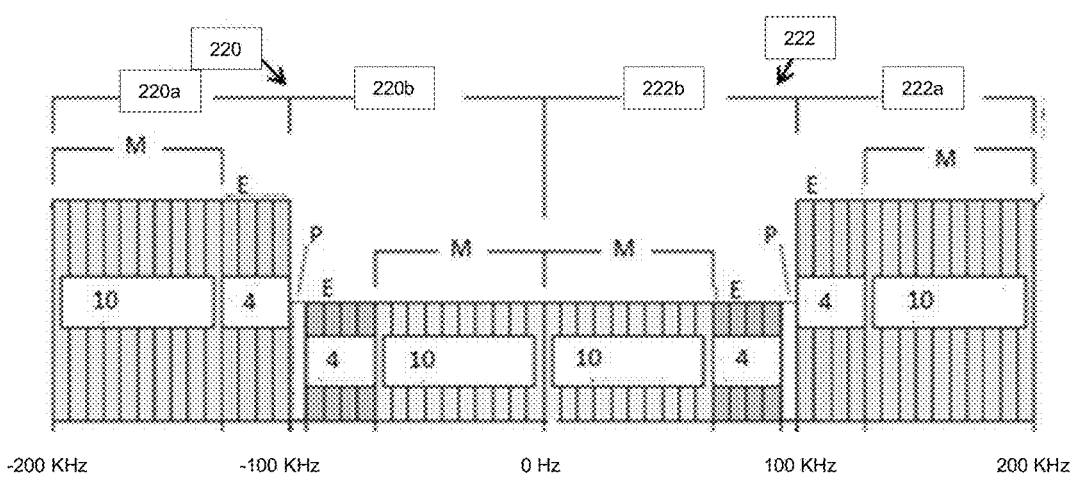
FIG. 2 shows a spectrum plot of an all-digital implementation of an IBOC signal.

FIG. 2 shows a spectrum plot of an all-digital implementation of an IBOC signal. For the all-digital IBOC FM signal, the analogue FM-signal is replaced by a (secondary) digitally-modulated signal 220b, 222b. In the all-digital mode, the bandwidth of the primary digital sidebands 220a, 222a is fully expanded with lower-power secondary sidebands.

The all-digital IBOC signal has a bandwidth of roughly 400 kHz. Approximately 100 kHz of each of the lower and upper adjacent channels is occupied (that is, the frequencies that are outside the 200 kHz "channel-grid"). The lower digital sideband of the all-digital IBOC signal is shown as 220 and the upper digital sideband is shown as 222. Each has a primary section 220a, 222a and a secondary section 220b, 222b. In FIG. 2, the number of extended frequency partitions (E) is fixed to 4. In a hybrid-mode system, for example as shown in FIG. 1, the number of extended frequency partitions (E) can be; 0, 1, 2, or 4, depending on the transmitted service mode.

CPPC-Codes Decoding Using LLRs for (H)IBOC Reception

Log-likelihood ratios (LLR) can be computed for decoding complementary punctured-pair convolutional codes (CPPC-codes) for In-band/on-channel (IBOC) transmissions. A Viterbi-decoder can then decode the LLRs in order to obtain an output signal.

Figure 3:
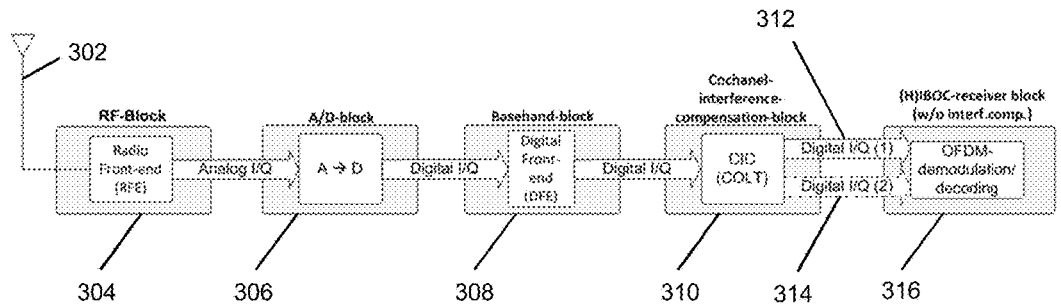
FIG. 3 shows an example embodiment of a block diagram of a two-path CIC receiver system.

FIG. 3 shows an example embodiment of a block diagram of a two-path CIC receiver system. The receiver system includes an antenna 302 that is coupled to an RF-block 304, which includes a radio front-end (RFE). The RFE provides an analogue I/Q signal to an A/D block 306. The A/D block 306 provides a digital I/Q signal to a baseband block 308. The baseband block 308 includes a digital front-end (DFE), which provides another digital I/Q signal to a co-channel-interference-compensation-block 310, which in this example performs a COntinuous Look Through (COLT) algorithm for co-channel-interference compensation (CIC). As shown in FIG. 3, the co-channel-interference-compensation-block 310 provides a first digital I/Q signal 312 and a second digital I/Q signal 314 to a H(IBOC)-receiver block 316 for OFDM demodulation and decoding. These two digital I/Q signals can be decoded by separate receiver chains. The H(IBOC)-receiver block 316 in this example does not include interference compensation.

In this way a second path, which provides the second digital I/Q signal 314, is made available after the band-separation filter 308 or the "isolation-filters". The H(IBOC)-receiver block 316 can process this second digital I/Q signal 314, in order to perform FFT (OFDM-processing), do demodulation, perform channel-estimation, and compute soft-decision-information (i.e., LLRs) of each coded-bit. The $1^{st}$-path will perform the same tasks as the $2^{nd}$-path in order to provide the first digital I/Q signal 312, however, in addition in this path a CIC is applied. This CIC can be based on the so called; "COntinuous-Look-Through (COLT)-principle", which is described in US-patent: U.S. Pat. No. 6,259,893 B1, "Method and Apparatus for Reduction of FM Interference for FM In-Band On-Channel Digital Audio Broadcasting System", July 2001, Kroeger et. al.

Now, for this two-path CIC-approach, the LLRs for the Viterbi-decoder are obtained by combining the soft-decision bit-metrics of each of the paths. This combining is performed as an addition in the frequency-domain of the LLR-values of the $1^{st}$-path and the $2^{nd}$-path, i.e., after Channel-State-Information (CSI) estimation within the H(IBOC)-receiver block 316. As a result, final LLR values can be determined as the sum of the LLR values of the individual paths.

Furthermore, it is assumed for the signal-model that a known cyclic prefix (CP) completely eliminates any Inter-Symbol-Interference (ISI) and that there is no Inter-Carrier-Interference (ICI). The receiver estimates and compensates, for the (H)IBOC-stream, the timing and frequency-offset.

In the following sections, a novel decoding of CPPC-codes that uses improved LLR-values will be described. The improved LLR-values may be referred to as advanced log-likelihood ratios (ALLRs). As will be discussed below, the H(IBOC)-receiver block 316 can calculate the ALLRs by processing a single digital I/Q signal 312. That is, a second digital I/Q signal 314 would no longer be required. Therefore, the H(IBOC)-receiver block 316 would only require a single receiver chain.

Averaging-Processing-Block

Figure 4:
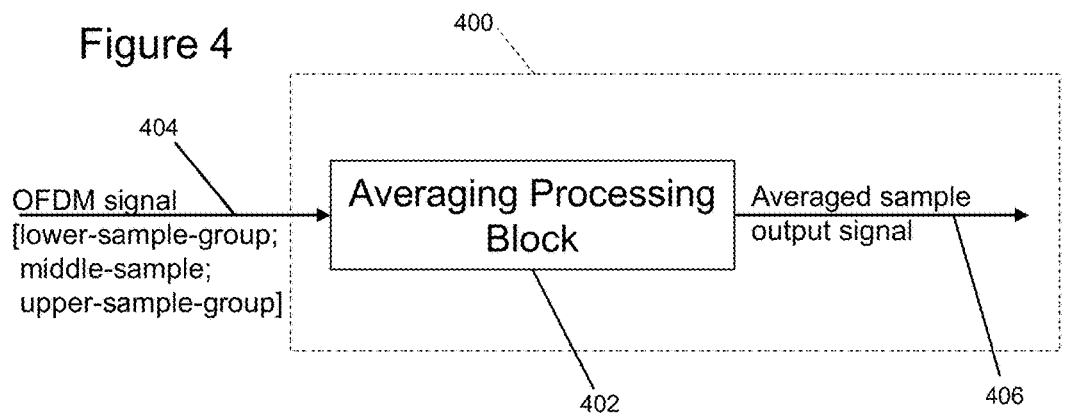
FIG. 4 shows an example embodiment of a receiver circuit that includes an averaging-processing-block.

FIG. 4 shows a receiver circuit 400, which can perform at least some of the functionality of an H(IBOC)-receiver block, such as the one illustrated in FIG. 3. However, the receiver circuit 400 does not require both of the two digital I/Q signals that are provided as an input signals in FIG. 3.

The receiver circuit includes an averaging-processing-block 402 that receives an OFDM signal 404. The OFDM signal 404 includes a plurality of sample-values. As will be discussed below with reference to FIG. 5, the samples that are processed by the averaging-processing-block 402 can be in the frequency-domain. However, these frequency-domain samples represent the subcarriers of OFDM-symbols, which also provide time-behaviour (information) by the sequential order of the OFDM-symbols. Therefore, the plurality of sample-values that are processed by the averaging-processing-block 402 can be considered as being spaced apart in the time domain, even though they represent information in the frequency domain. As will be discussed in detail below, (i) the sample-values can be channel-estimate-sample-values that are representative of an estimate for the transfer function of the channel for each received sample, or (ii) the sample-values can be noise-estimate-sample-values that are representative of an estimate for a noise signal that is present in each sample. The averaging-processing-block 402 is configured to determine an averaged-sample-value for each received sample, and then provide an averaged-sample-output-signal 406 that includes the averaged-sample-values. The averaged-sample-output-signal 406 can then be used by other components (not shown in FIG. 4) in the receiver circuit 400 in order to perform demodulation and decoding. Examples of such "other components" will be discussed in detail below with reference to FIG. 5.

In this example, a total number of N sample-values of the OFDM signal 404 is processed by the averaging-processing-block 402 in order to determine an averaged-sample-value for each received sample. The N sample-values for each averaging operation can be considered as comprising: a middle-sample-value (n); a lower-sample-value-group; and a higher-sample-value-group. Sample-values for samples in the lower-sample-value-group have been received earlier in time than the middle-sample-value. Sample-values for samples in the higher-sample-value-group have been received later in time than the middle-sample-value. In this way, frequency-domain samples that have a sequential-order can be used for averaging, wherein the sequential-order represents earlier and later in time. For example, the first frequency-domain samples represent the first received, and thus transmitted, (in time-order) OFDM-symbol.

In this example, the lower-sample-value-group and the higher-sample-value-group contain the same number of sample values, and N is assumed to be an odd number for convenience. Therefore, the lower-sample-value-group can be defined as sample values between (n−((N−1)/2) and (n−1); and the higher-sample-value-group can be defined as sample values between (n+1) and (n+((N−1)/2)).

Advantageously, the averaging-processing-block 402 is configured to determine the averaged-sample-value for the middle-sample-value (n) by performing an averaging operation on the sample-values of the lower-sample-value-group and the higher-sample-value-group, but not on the middle-sample-value. The averaging operation may be the calculation of a mean. It has been surprisingly found that by omitting the middle-sample-value from the averaging operation, the receiver circuit 400 can more accurately demodulate and decode an OFDM signal. This surprising result will be discussed in detail mathematically with reference to FIG. 5, and is also illustrated graphically in FIG. 6.

The processing of the averaging-processing-block 402 may also be referred to as an extrinsic information averaging ("Exia") technique. This approach can be considered similar to the usage of "extrinsic-information" in an iterative-setting because a sample of interest is not included in the averaging process; instead only the "neighbours" of the sample/data-symbol of interest are included.

CPPC-Codes Decoding with Advanced-LLRs for an (H)IBOC Reception

Figure 5:
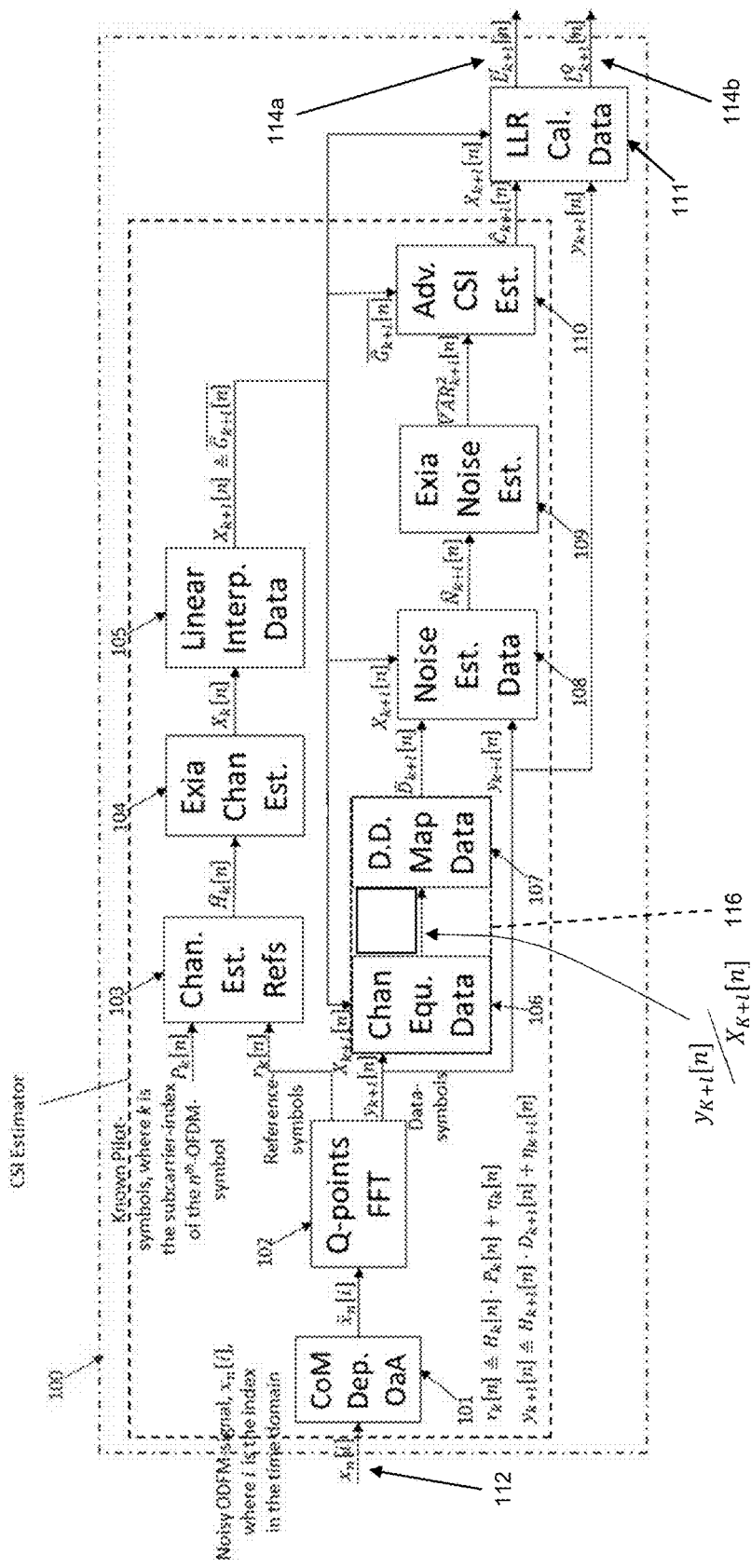
FIG. 5 shows another example embodiment of a receiver circuit that includes two averaging-processing-blocks.

FIG. 5 shows a receiver circuit 100 that includes two averaging-processing-blocks that provide the functionality of FIG. 4: an Exia-channel-estimator (channel-averaging-processing-block) 104 and an Exia-noise-estimator (noise-averaging-processing-block) 109. The full system of FIG. 5 will now be described. The functionality of some components will be described with reference to both: (i) the calculation of advanced log-likelihood ratios (ALLRs); and (ii) the calculation of log-likelihood ratios (LLRs) that do not include the new functionality of the present disclosure.

The receiver circuit 100 receives a noisy input-OFDM-signal 112 ($x_n[i]$), where i is the index in the time domain. The noisy input-OFDM-signal 112 ($x_n[i]$) includes information that is representative of reference-symbols and data-symbols, as will be discussed below. The receiver circuit 100 provides, as output signals, a first-output-LLR-signal ($\hat{L}_{k+l}^I[n]$) 114a, and a second-output-LLR-signal ($\hat{L}_{k+l}^Q[n]$) 114b. These output-LLR-signals are representative of the most likely values for the data-symbols that were received as part of the input-OFDM-signal 112 ($x_n[i]$). Advantageously, as will be discussed below, the receiver circuit 100 of FIG. 5 can achieve a low bit error rate (BER) for a given signal-to-noise-ratio SNR, or can achieve a low SNR for a given BER. In this way, the sensitivity of the receiver circuit 100 can be improved.

With an (H)IBOC transmission, in hybrid as well as in all-digital mode, the digitally modulated lower- and upper sidebands are based on a specific form of Coded-OFDM (COFDM). In a (H)IBOC-transmission the two (upper and lower) 1st-adjacent FM-signals are co-channel interference-signals for the digitally-modulated COFDM-signals, since they reside on the lower and upper side-bands of the (H)IBOC transmitted signal. Therefore, to be robust against these 1st-adjacent (FM) co-channel interference signals, the (H)IBOC-system associated with the receiver circuit 100 of FIG. 5 does not apply the conventional Rate-Compatible Punctured Conventional (RCPC)-codes. Instead, the (H)IBOC transmission-system uses a special kind of a convolutional-coding scheme, namely "Complementary Punctured-Pair Convolutional (CPPC)"-codes, which are robust against the 1st-adjacent FM-interference signals. These CPPC-codes can be optimally decoded by a maximum a-posteriori probability (MAP) decoder or, to reduce complexity, by a maximum likelihood (ML) decoder, as is the case with conventional convolutional codes. It is well-known that the Viterbi-decoding algorithm is an efficient ML-decoder for decoding convolutional codes, therefore, a Viterbi-engine can be provided downstream of the receiver circuit 100 such that it can decode the first-output-LLR-signal 114a and the second-output-LLR-signal 114b to determine the CPPC-codes.

Here, it is worth mentioning that the (H)IBOC-system can use a tail-biting version of the convolutional-codes to be more efficient, especially for short code-words. A tail-biting convolutional decoder assumes that the begin-state of the code-word is identical to the end-state of the code-word. Consequently, the code word does not need to be expanded with tail-bits to force the convolutional-code to the zero-state at the end of the code-word. To obtain good performance, the tail-biting Viterbi-decoding computes the most likely bit-sequence with the probability of each coded-bit, i.e., soft-decision bit-metrics or "soft-decision Viterbi-decoding". This soft-decision bit information is based on the log-likelihood ratio (LLR) of each coded-bit, as provided by the first-output-LLR-signal 114a and the second-output-LLR-signal 114b, which can be sufficient information to obtain maximum-likelihood performances for decoding convolutional codes.

The receiver circuit 100 of FIG. 5 can perform an advanced log-likelihood ratio (ALLR) computation to generate the first-output-LLR-signal 114a and the second-output-LLR-signal 114b signals for use by a soft-decision (tail-biting) Viterbi-decoder. As will be discussed in detail below, the computation of these advanced LLRs includes one or more of the following beneficial algorithms:

1) "Center-of-Mass (CoM) dependent Overlap-and-Add (OaA)" represented by an overlap-and-add-processor 101,
2) "Extrinsic information averaging (Exia)" represented by an Exia-channel-estimator 104 and an Exia-noise-estimator 109, and
3) "Data-decision directed (DD) Channel-State-Information (CSI)" represented by blocks 106-110

These ALLR-computations do not make use of any feedback of the decoded bits; they do not require "iterative decoding of CPPC-codes", that is, CPPC-codes with iterative decoding (CPPC-ID). However, the newly-proposed ALLR algorithms can be combined with iterative decoding techniques in some applications.

Overview of FIG. 5

The receiver circuit 100 of FIG. 5 includes an overlap-and-add-processor 101. The overlap-and-add-processor 101 determines a centre-of-mass of the plurality of time-domain-samples of the input-OFDM-signal 112 ($x_n[i]$), and then performs an overlap-and-add operation on the input-OFDM-signal 112 ($x_n[i]$) based on the determined centre-of-mass in order to provide a processed-OFDM-signal ($\tilde{x}_n[i]$), which includes a plurality of processed-time-domain-samples.

A domain-converter 102 converts the processed-time-domain-samples $\tilde{x}_n[i]$ into: (a) a plurality of reference-sample-values ($r_k[n]$); and (b) a plurality of data-sample-values ($y_{k+l}[n]$) in the frequency domain. In this example the domain-converter 102 performs a Q-points FFT.

The reference-sample-values ($r_k[n]$) are processed by a channel-estimator 103, an Exia-channel-estimator 104 and an optional linear-interpolator 105 in order to determine interpolated-channel-estimates ($X_{k+l}[n]$). The interpolated-channel-estimates ($X_{k+l}[n]$) may also be referred to as "channel-estimation-data". More specifically, the channel-estimator 103 processes the reference-sample-values ($r_k[n]$) and corresponding pilot-sample-values ($P_k[n]$) in order to determine channel-estimate-sample-values ($\hat{H}_k[n]$). The Exia-channel-estimator 104 then performs an averaging operation on the channel-estimate-sample-values ($\hat{H}_k[n]$) in order to provide channel-estimates ($X_k[n]$). The linear-interpolator 105 can use the channel estimates ($X_k[n]$) to compute "interpolants", that is, "in-between-results". The linear-interpolator 105 provides interpolated-channel-estimates ($X_{k+l}[n]$) as an output signal, which represent the determined characteristics of the channel, based on a comparison between the reference-sample-values ($r_k[n]$) and the pilot-sample-values ($P_k[n]$).

The data-sample-values ($y_{k+l}[n]$) are processed by a virtual-pilot-signal-generator 116, a noise-estimator 108, an Exia-noise-estimator 109 and a CSI-estimator 110 in order to determine channel-state information ($\hat{C}_{k+l}[n]$). More specifically, the virtual-pilot-signal-generator 116 generates "virtual-pilots" ($\hat{D}_{k+l}[n]$) for the data-sample-values ($y_{k+l}[n]$) based on the data-sample-values ($y_{k+l}[n]$) and the interpolated-channel-estimates ($X_{k+l}[n]$). The noise-estimator 108 processes the data-sample-values ($y_{k+l}[n]$) and corresponding "virtual-pilots" ($\hat{D}_{k+l}[n]$) in order to determine noise-samples ($\hat{N}_{k+l}[n]$). The Exia-noise-estimator 109 then performs an averaging operation on the noise-samples ($\hat{N}_{k+l}[n]$) in order to provide noise-variance ($\widehat{VAR}_{k+l}^2[n]$). The CSI-estimator 110 then processes the noise-variance ($\widehat{VAR}_{k+l}^2[n]$) and the interpolated-channel-estimates ($X_{k+l}[n]$) in order to determine the channel-state information ($\hat{C}_{k+l}[n]$).

Advantageously, more accurate channel-state information can be generated using the data-sample-values, rather than the reference-sample-values, because typically there will be more data-samples than reference-samples available for processing. Therefore, no interpolation may be required by processing the reference-samples. However, the received data-samples are mapped into "virtual-pilots".

Finally, an LLR-calculator 111 processes the interpolated-channel-estimates ($X_{k+l}[n]$), the channel-state information ($\hat{C}_{k+l}[n]$), and the data-sample-values ($y_{k+l}[n]$) in order to determine the first-output-LLR-signal $\hat{L}_{k+l}^I[n]$ 114a and the second-output-LLR-signal $\hat{L}_{k+l}^Q[n]$ 114b for the received data-sample-values ($y_{k+l}[n]$).

Center-of-Mass (CoM) Dependent Overlap-and-Add (OaA)

The overlap-and-add-processor 101 receives the input-OFDM-signal 112 ($x_n[i]$), which as discussed above includes a plurality of time-domain-samples. The overlap-and-add-processor 101 determines a centre-of-mass of the plurality of time-domain-samples, and then performs an overlap-and-add operation on the input-OFDM-signal 112 ($x_n[i]$) based on the determined centre-of-mass in order to provide a processed-OFDM-signal ($\tilde{x}_n[i]$), which includes a plurality of processed-time-domain-samples.

The center of mass (CoM) technique/algorithm takes into account the delay-spread of the channel and attempts to place the largest part of the channel energy into a guard-window, i.e., the center of the safe range (nominal position). The usual method of finding the CoM is by summating (or integrating) the "mass" and the "moment of mass" from the start of one OFDM-symbol $x_n[i]$ so, the CoM can be defined as;

$$CoM = \frac{\sum_{i=1}^{N_s} |x_n[i]|^2 \cdot i}{\sum_{i=1}^{N_s} |x_n[i]|^2} \quad \text{Eq. 1}$$

here n indicates the $n^{th}$-OFDM-symbol with (time) sample-index $i \in [1, 2, \ldots, N_s]$ where $N_s$ is the total number of samples of the OFDM-symbol. Now, we might use, for computational efficiency reasons;

$$CoM = \frac{\sum_{i=1}^{N_s} \Re\{x_n[i]\} \cdot i}{\sum_{i=1}^{N_s} \Re\{x_n[i]\}} \quad \text{Eq. 2}$$

where, $\Re\{\bullet\}$ is the real-part of a complex number and $x_n[i]$ the OFDM-symbol sample-value. As a result, Eq. 2 gives the distance of the CoM in samples from the start of one OFDM-symbol. The CoM algorithm derives an error signal indicating the current symbol timing position relative to the desired position.

In the case of an (H)IBOC-transmission, the output of the IFFT-process, i.e., the time-domain output of the OFDM-symbol signal-generation, can be shaped with a specific pulse. This pulse-shaping is applied to have a smoother transition, in the time-domain, from one OFDM-symbol to the next OFDM-symbol. This smoother transition in the time-domain results in the out of band power of the OFDM-signal being limited. Note, that this is desirable since the digitally-modulated OFDM-signals are combined with the analog host signal in the hybrid-mode, as shown in FIG. 1. Moreover, in the all-digital transmission-mode, shown by FIG. 2, the out of band power might "interfere" with the $1^{st}$-adjacent FM (neighbour) signals, since they are co-channeled with the primary sidebands, e.g., sections 220a and 222a in FIG. 2. Applying pulse-shaping of the OFDM-symbol will result in reducing the total transmitted energy of the OFDM-symbol compared to if a "brick-wall" pulse-shape (actually, no pulse-shaping) was applied, i.e., the total energy is transmitted. However, in the (H)IBOC-system, the shape-curve occupies half the guard length. Now, to overcome "loss-of-energy" for the OFDM-carriers, an "Overlap-and-Add (OaA)" technique can be applied at the receiver-side before the FFT-operation that is performed by the domain-converter 102.

Conventional Overlap-and-Add (OaA) Technique

A conventional OaA-technique copies the last guard-time samples of the OFDM-symbol and adds these to the first guard-time samples of the OFDM-symbol to restore the energy, this yields;

$$x_n[B] \stackrel{def}{=} x_n[1:N_g] \quad \text{Eq. 3}$$
$$x_n[E] \stackrel{def}{=} x_n[Q+1:N_s],$$
$$n \in \mathbb{Z}$$

with $$\tilde{x}_n[1:N_g] \stackrel{def}{=} x_n[B] + x_n[E] \quad \text{Eq. 4}$$
$$\tilde{x}_n[Q+1:N_s] \stackrel{def}{=} x_n[E] + x_n[B],$$
$$n \in \mathbb{Z}$$

where $N_g$ is the number of cyclic-prefix or guard-samples, Q is the number of samples of the FFT-length, $N_s = N_g + Q$ is the total number of samples of the OFDM-symbol. However, it is here assumed that the FFT-window will start at the beginning of the OFDM-symbol. This is a preferable scenario if and only if there is no (or at least quite small) multipath, i.e., the maximal delay-spread of the channel is small. However, if this assumption of a small maximal delay-spread does not hold, then the start of the FFT-window should be shifted to a new-position that takes into account the delay-spread of the channel and attempts to place the largest part of the channel energy into the guard-window. This, as stated in the beginning of this section, is the objective of the CoM-algorithm. However, in the case of the (H)IBOC-system, the pulse-shaping reduces the available energy within the guard-period. Therefore, a trade-off can be made between allowing energy of the previous OFDM-symbol to interfere (inter-symbol interference ISI), and losing energy of the current OFDM-symbol by pulse-shaping.

Newly Proposed CoM-Dependent OaA-Technique

The overlap-and-add-processor of FIG. 5 enables such a trade-off between ISI and energy-loss to be achieved by applying a CoM-dependent Overlap-and-Add technique. That is, it performs a partial overlap and add. This partial overlap and add technique starts at the CoM-position and ends at the end of cyclic-prefix, i.e., at the last sample of the guard-period. This yields for the $n^{th}$ OFDM-symbol and a $\lceil CoM \rceil \geq 0$;

$$x_n[B] \stackrel{def}{=} x_n[\lceil CoM \rceil + 1:N_g]$$
$$x_n[E] \stackrel{def}{=} x_n[Q + \lceil CoM \rceil + 1:N_s],$$
$$n \in \mathbb{Z}$$

where $$\tilde{x}_n[\lceil CoM \rceil + 1:N_g] \stackrel{def}{=} x_n[B] + x_n[E]$$
$$\tilde{x}_n = [Q + \lceil CoM \rceil + 1:N_s] \stackrel{def}{=} x_n[E] + x_n[B],$$
$$n \in \mathbb{Z},$$

Eq. 5

Eq. 6 wherein the rounding-operator $\lceil \cdot \rceil$ rounds positive elements with a fractional part of +0.5 up to the nearest positive integer, and for the $\lfloor CoM \rfloor < 0$, this approach becomes;

$$x_n[B] \stackrel{def}{=} x_n[1:N_g + \lfloor CoM \rfloor]$$
$$x_n[E] \stackrel{def}{=} x_n[Q + 1:N_s + \lfloor CoM \rfloor],$$
$$n \in \mathbb{Z}$$

where $$\tilde{x}_n[1:N_g + \lfloor CoM \rfloor] \stackrel{def}{=} x_n[B] + x_n[E]$$
$$\tilde{x}_n[Q + 1:N_s + \lfloor CoM \rfloor] \stackrel{def}{=} x_n[E] + x_n[B],$$
$$n \in \mathbb{Z}$$

Eq. 7

Eq. 8 wherein the rounding-operator $\lfloor \cdot \rfloor$ rounds negative elements with a fractional part of −0.5 down to the nearest negative integer. In addition, for the "none-defined sample-values for $\tilde{x}_n[i]$" by the above equations, we get;

$$\tilde{x}_n[i] = x_n[i], i \in [1,2, \ldots N_s-1, N_s], n \in \mathbb{Z}$$

Eq. 9

This newly-proposed technique we call; "Center-of-Mass (CoM) dependent Overlap-and-Add (OaA)" technique because the overlap-and-add is performed in accordance with a determined centre-of-mass. More specifically, the newly proposed algorithm sets an OaA-cut-off, which defines a boundary within the guard samples between: (i) a first set of guard samples; and (ii) a second set of guard samples, wherein the sample-values of the first set of guard samples will be copied to the sample-values of the second set of guard samples. The overlap-and-add-processor 101 can advantageously set the OaA-cut-off based on the determined centre-of-mass in order to make an acceptable trade-off between ISI and lost energy due to pulse-shaping. In this way, the CoM can define starting and end-points for performing the overlap- and add, which can be different to those that would be determined by a conventional OaA algorithm.

Extrinsic Information Averaging ("Exia") Technique

As discussed above, this technique corresponds to the functionality of the averaging-processing-block of FIG. 4.

In this example, the Exia averaging-technique will be applied for the channel-estimation (as performed by the Exia-channel-estimator 104) and also for the Noise-variance computation (as performed by the Exia-noise-estimator 109).

We will explain the notion; "Extrinsic-information averaging (Exia)" and the motivation to use this technique in the computation of the ALLRs to decode the CPPC-codes of the (H)IBOC-system. By explaining the ALLR computation we will refer to the processing-procedures in the frequency-domain shown by blocks 103-111 of the receiver circuit 100 of FIG. 5. That is, the processing that is performed after the domain-converter 102, which represents a Q-points FFT operation.

Conventional Averaging Technique with Reference-Symbols

We begin with describing the scenario where the expected value of a reference-symbol is known. For example, received reference-symbols can be compared with expected pilot symbols. In this example, the received reference-symbols ($r_k[n]$) are provided by the domain-converter 102, and a BPSK-pilot on OFDM-subcarrier with index k and for the $n^{th}$ OFDM-symbol, $$P_k[n] \in \{\sqrt{2} e^{j\frac{\pi}{4}}, \sqrt{2} e^{j\frac{5\pi}{4}}\},$$

is also known. As will be discussed below, the reference-symbols ($r_k[n]$) will be used for: channel-coefficient estimation $\hat{H}_k[n]$, noise-variance estimation $\hat{\sigma}_k^2[n]$, and (implicitly) for channel-state-information $$(CSI)\widehat{CSI}_k[n] \stackrel{def}{=} \frac{|\hat{H}_k[n]|^2}{\hat{\sigma}_k^2[n]}$$

computation.

We start with the model that the received reference-symbol on OFDM-subcarrier with index k and for the $n^{th}$ OFDM-symbol is given by;

$$r_k[n] = H_k[n] \cdot P_k[n] \eta_k[n], n \in \mathbb{Z}$$

Eq. 10 where $\eta_k[n]$ represents circular complex Gaussian noise with variance $\sigma_k^2[n]$ The channel-estimator 103 of FIG. 5 that receives: (i) an OFDM signal that comprises a plurality of reference-sample-values/reference-symbols ($r_k[n]$); and (ii) an OFDM signal that comprises a plurality of pilot-sample-values ($P_k[n]$), wherein the pilot-sample-values ($P_k[n]$) correspond to the received reference-sample-values ($r_k[n]$). As will be discussed below, the channel-estimator 103 processes the pilot-sample-values ($P_k[n]$) and the received reference-sample-values ($r_k[n]$) in order to determine a plurality of channel-estimate-sample-values ($\hat{H}_k[n]$).

The channel-estimator 103 can perform a well-known approach for determining an estimate of the channel with the aid of the known reference-symbols, e.g., the pilots, gives;

$$\hat{H}_k[n] = \frac{r_k[n] \cdot P_k^*[n]}{2} = H_k[n] + \frac{\eta_k[n] \cdot P_k^*[n]}{2} \stackrel{def}{=} H_k[n] + \tilde{\eta}_k[n],$$
$$n \in \mathbb{Z}$$

Eq. 11

For an estimate of the $\widehat{CSI}_k[n]$, an estimate of the noise-variance $\hat{\sigma}_k^2[n]$ can also be required. Therefore, estimates of N noise-samples are computed and a conventional statistical-average (i.e., the mean-value) over the squared absolute value of these N noise-samples is taken. Moreover, as will be discussed in detail below with reference to the noise-estimator 108, estimates of the noise-samples are obtained with the aid of, both, the known reference-symbols and the estimates of the channel-coefficients and this approach yields;

$$\hat{N}_k[n] = r_k[n] - P_k[n] \cdot \hat{H}_k[n], n \in \mathbb{Z} \quad \text{Eq. 12}$$

To reduce the impact of the noise on the estimated channel-coefficients and to obtain a noise-variance of the noise-samples, we can calculate the statistical-average of the estimated channel-coefficients $\hat{H}_k[n]$ (using the channel-estimator 103) and the statistical-average of the estimated noise-samples $\hat{N}_k[n]$.

The following discussion, in relation to Equations 13 to 24, relates to an averaging technique that does not use the "Exia" processing that is described above with reference to FIG. 4. That is, the Exia-channel-estimator 104 and the Exia-noise-estimator 109 in FIG. 5 are initially described as if they perform a conventional mean averaging operation on a group of sample-values that does include a middle-sample-value/sample of interest. (In contrast, as discussed herein, "Exia" processing is defined as an averaging operation that does not include the middle-sample-value/sample of interest.) However, some of equations 13 to 24 have been expressed in such a way that they can be used to illustrate how the "Exia" processing can improve the performance of the receiver circuit 100. Representing the equations in this way would not be obvious to the person skilled in the art based solely on well-known equations for calculating the mean of sample-values.

The statistical-average of the estimated channel-coefficient $\hat{H}_k[n]$ will be approximated by a commonly used mean-value, i.e., take the sum of the N values and divide them by the number of values N, which yields for a conventional average channel-estimation;

$$\overline{\hat{H}_k[n]} \stackrel{def}{=}$$
$$\frac{1}{N} \sum_{i=n-\frac{N-1}{2}}^{n+\frac{N-1}{2}} \hat{H}_k[i] = \frac{r_k[n] \cdot P_k^*[n]}{2N} + \frac{1}{2N} \sum_{\substack{i=n-\frac{N-1}{2} \\ i \neq n}}^{n+\frac{N-1}{2}} r_k[i] \cdot P_k^*[i] =$$
$$\frac{r_k[n] \cdot P_k^*[n]}{2N} + \left(1 - \frac{1}{N}\right) X_k[n], n \in \mathbb{Z}$$

Eq. 13 where we assumed for simplicity that N is odd. Eq. 13 separately shows (i) the processing for the upper- and lower-sample-value-groups as the second term on the right-hand side of the equals sign; and (ii) the processing for the middle-sample-value as the first term on the right-hand side of the equals sign. Eq. 13 is artificially expressed in this in order assist the description of the "Exia" processing that will follow below.

An important observation we would like to make here is, that the introduced term;

$$X_n[n] \stackrel{def}{=} \frac{1}{2(N-1)} \sum_{\substack{i=n-\frac{N-1}{2} \\ i \neq n}}^{n+\frac{N-1}{2}} r_k[i] \cdot P_k^*[i], n \in \mathbb{Z} \quad \text{Eq. 14}$$

represents a special-kind of average over N−1 out of N terms without the $n^{th}$-term, i.e., the "extrinsic-information" of the $n^{th}$-term, which we refer to herein as "Exia" processing, and will be discussed in detail below. Also note, to help explain the subsequent abandonment of the $n^{th}$-term, that substitution of Eq. 11 into Eq. 12 results in that the $n^{th}$-noise-sample;

$$\hat{N}_k[k] = r_k[n] - P_k[n] \cdot \frac{r_k[n] \cdot P_k^*[n]}{2} = 0,$$

i.e., it equals zero regardless of the received signal. This is because the same perfectly known $n^{th}$-pilot is the reference-symbol for the channel-estimation as well as for the noise-variance.

The noise-variance $\hat{\sigma}_k^2[n]$ is the statistical average of the squared absolute estimated noise-samples, i.e., $\hat{\sigma}_k^2[n] = E\{|\hat{N}_k[n]|^2\}$, and will be approximated by;

$$\hat{\sigma}_k^2[n] \stackrel{def}{=} \frac{1}{N} \sum_{i=n-\frac{N-1}{2}}^{n+\frac{N-1}{2}} |\hat{N}_k[i]|^2 = \frac{1}{N} \sum_{i=n-\frac{N-1}{2}}^{n+\frac{N-1}{2}} \left|r_k[i] - P_k[i] \cdot \overline{\hat{H}_k[i]}\right|^2, \quad \text{Eq. 15}$$

$$n \in \mathbb{Z}$$

Substitution of Eq. 13 into Eq. 15, yields for the noise-variance;

$$\hat{\sigma}_k^2[n] = \frac{1}{N} \sum_{i=n-\frac{N-1}{2}}^{n+\frac{N-1}{2}} \left|r_k[i] - P_k[i]\left(\frac{r_k[i] \cdot P_k^*[i]}{2N} + \left(1 - \frac{1}{N}\right) X_k[i]\right)\right|^2, \quad \text{Eq. 16}$$

$$n \in \mathbb{Z}$$

and can be rewritten as;

$$\hat{\sigma}_k^2[n] = \frac{1}{N}\left(1 - \frac{1}{N}\right)^2 \sum_{i=n-\frac{N-1}{2}}^{n+\frac{N-1}{2}} |r_k[i] - P_k[i] \cdot X_k[i]|^2, \quad \text{Eq. 17}$$

$$n \in \mathbb{Z}$$

Now the channel-state-information $\widehat{CSI}_k[n]$ becomes;

$$\widehat{CSI}_k[n] = \quad \text{Eq. 18}$$

$$\frac{|\hat{H}_k[n]|^2}{\hat{\sigma}_k^2[n]} = \frac{|P_k[n]|^2 \cdot N^2 \cdot \left|\frac{r_k[n] \cdot P_k^*[n]}{2N} + \left(1 - \frac{1}{N}\right) X_k[n]\right|^2}{2N^2 \cdot \hat{\sigma}_k^2[n]} =$$

$$\frac{|r_k[n] + P_k[n] \cdot (N-1) \cdot X_k[n]|^2}{2N\left(1 - \frac{1}{N}\right)^2 \sum_{i=n-\frac{N-1}{2}}^{n+\frac{N-1}{2}} |r_k[i] - P_k[i] \cdot X_k[i]|^2},$$

$$n \in \mathbb{Z}$$

Note, that for the $2^{nd}$-equality we multiplied numerator and denominator with $|P_k[n]|^2 \cdot N^2$ and used that $|P_k[n]|^2 = 2$.

From Eq. 18 we can now see the remarkable result that for N=1, i.e., there is no noise-averaging, the numerator term (N−1)·$X_k$[n] with the "extrinsic-info" equals zero (i.e., disappears due to N−1=0) and the denominator goes to zero, ∀$_l$, due to the factor $$\left(1 - \frac{1}{N}\right).$$

Consequently, the estimate of the channel-state-information $\widehat{CSI}_k$[n] becomes infinity for N=1, i.e., when no-averaging is applied. Therefore, Eq. 18 suggests that the channel-state-information $\widehat{CSI}_k$[n] is representative of an output-sample-value with 100% certainty when no averaging is performed. This conclusion is counter-intuitive.

Further still, Eq. 18 also reveals that for smaller N, i.e., if less-averaging is applied, the CSI will grow due to the proportional-term $$N\left(1 - \frac{1}{N}\right)^2$$

within the denominator. Note, that the CSI scales the reliability of a bit, i.e., it scales the soft-decision information. Thus, it is rather contradictory that less noise-averaging results in a better reliability, i.e., more reliable soft-decision information. It has been found that a statistical-averaging approach, which uses all sample-values including the middle-sample-value, for determining the channel-coefficient and the noise-variance with (perfectly-known) pilots, i.e., reference-symbols, is not an optimal way to compute the channel-state-information.

Conventional LLR-Computation with Reference-Symbols

Nevertheless, as an exercise and to show the "remarkable less-averaging result", we will go on to compute the log-likelihood-ratio (LLR) for the BPSK reference-symbol $P_k$[n] with the estimate for the CSI given by Eq. 18 and the well-known result for the Gaussian log-likelihood-ratio, this yields;

$$\widehat{LLR}_k[n] = \widehat{CSI}_k[n] \cdot \Re\left\{\frac{r_k[n]}{\widehat{H}_k[n]}\right\} = $$
$$N \cdot \widehat{CSI}_k[n] \cdot \Re\left\{\frac{r_k[n]}{r_k[n] + (N-1) \cdot P_k[n] \cdot X_k[n]} \cdot P_k[n]\right\},$$
$$n \in \mathbb{Z}$$
Eq. 19 where for the second equality the numerator and denominator are both multiplied with $NP_k$[n]. Indeed, it can be seen from Eq. 19 that less averaging will apparently still result in more reliable soft-decision information, and that if no averaging is applied at all, then perfect likelihood information is determined. This is because, if no averaging is applied at all such that N=1, then the term (N−1)$X_k$[n] with the "extrinsic-info" becomes equal to zero and, as already mentioned above, the $\widehat{CSI}_k$[n] becomes infinity. Note, that the reference-symbol $P_k$[n] was assumed to be perfectly known so, if this is the case, then averaging will indeed, by definition, degrade the accuracy of the LLR of this perfectly known reference-symbol.

Therefore, it has been found that, surprisingly, if channel-estimates and noise-samples are obtained with the help of pilots (or "virtual-pilots" as will be discussed below) that these pilots are not included in the averaging process. That is, only the "neighbours" of the data-symbol of interest should be included. This approach corresponds to the processing described above with reference to the averaging-processing-block of FIG. 4. We will elaborate on the "Exia"-method in the following two sections: "Extrinsic-Information-Averaging (Exia) Technique with Reference-Symbols" and "Advanced(ALLR)-Computation (with Exia) for Data-Symbols".

Conventional LLR-Computation for Data-Symbols

However, before we will discuss the "Exia"-process we will first introduce a conventional log-likelihood ratio computation for unknown QPSK data-symbols. Where we use the following notation and model for the received QPSK data-symbol $$y_k[n] = H_k[n] \cdot D_k[n] + \eta_k[n], n \in \mathbb{Z}$$
Eq. 20 where $D_k$[n] is the transmitted QPSK data-symbol.

Note that in the conventional approach of this section, the channel-state information of the (known) BPSK reference-symbol $P_k$[n] is used and interpolated for the data-symbols. However, in the newly proposed approach; "data-decision directed (DD) CSI-computations", we will use "virtual-pilots" to compute the CSI, this approach is represented by blocks 106-110 of the receiver circuit 100.

Now, we will first discuss a conventional way of computing the CSI for the data-symbols by interpolation of the CSI of the reference-symbols. To describe the interpolation lets first rewrite the model for the QPSK data-symbols as;

$$y_{k+l}[n] = H_{k+l}[n] \cdot D_{k+l}[n] + \eta_{k+l}[n], l \in [1, 2, \ldots, L-1],$$
$$n \in \mathbb{Z}$$
Eq. 21 with $D_{k+l}$[n] the data-symbol on OFDM-subcarrier with index k+l of the $n^{th}$ OFDM-symbol. Where l indicates the OFDM-subcarrier index offset with respect to the reference-symbol at OFDM-subcarrier k up to the reference-symbol at OFDM-subcarrier k+L, i.e., the data-symbols are spectrally in between these two reference-symbols. The QPSK data-symbols ($y_{k+l}$[n]) are provided as an output signal from the domain-converter 102.

For the case that the channel-coefficients and the noise-variance of the reference-symbols are estimated, the channel-coefficients and the CSI-weights of the data-symbols might be obtained by "linear-interpolation", this yields;

$$\overline{H_{k+l}[n]} = (1-\alpha_l) \cdot \overline{H_k[n]} + \alpha_l \overline{H_{k+L}[n]}, l \in [1,2,\ldots,L-1], n \in \mathbb{Z}$$

$$\widehat{CSI}_{k+l}[n] = (1-\alpha_l) \cdot \widehat{CSI}_k[n] + \alpha_l \cdot \widehat{CSI}_{k+L}[n],$$
$$l \in [1,2,\ldots,L-1], n \in \mathbb{Z}$$
Eq. 22 where $$\alpha_l = \frac{l}{L}.$$

Hence, $\overline{H_{k+l}[n]}$ (and $\widehat{CSI}_{k+l}$[n]) of the unknown QPSK data-symbol is a linear-weighted value over the "interpolate-interval $k_L \triangleq$ [k+1, k+2, ... k+L−2, k+L−1]".

If we now look to the LLRs for the unknown QPSK data-symbols they become for the real I-branch;

$$\widetilde{LLR}_{k+l}^I[n] = \qquad \text{Eq. 23}$$

$$\hat{\overline{CSI}}_{k+l}[n] \cdot \Re\left\{\frac{y_{k+l}[n]}{\hat{\overline{H}}_{k+l}[n]}\right\} = ((1-\alpha_l)\hat{\overline{CSI}}_k[n] + \alpha_l \hat{\overline{CSI}}_{k+L}[n]) \cdot$$

$$\Re\left\{\frac{y_{k+l}[n]}{(1-\alpha_l)\hat{\overline{H}}_k[n] + \alpha_l \hat{\overline{H}}_{k+L}[n]}\right\},$$

$$l \in [1, 2, \ldots, L-1], n \in \mathbb{Z}$$

and for the imaginary Q-branch;

$$\widetilde{LLR}_{k+l}^Q[n] = \qquad \text{Eq. 24}$$

$$\hat{\overline{CSI}}_{k+l}[n] \cdot \mathcal{I}\left\{\frac{y_{k+l}[n]}{\hat{\overline{H}}_{k+l}[n]}\right\} = ((1-\alpha_l)\hat{\overline{CSI}}_k[n] + \alpha_l \hat{\overline{CSI}}_{k+L}[n]) \cdot \mathcal{I}$$

$$\left\{\frac{y_{k+l}[n]}{(1-\alpha_l)\hat{\overline{H}}_k[n] + \alpha_l \hat{\overline{H}}_{k+L}[n]}\right\},$$

$$l \in [1, 2, \ldots, L-1], n \in \mathbb{Z}$$

These LLRs represent the soft-decision information of the two bits per QPSK-symbol. Note, in this scenario it can be seen that the remarkable result of improving the soft-decision information by less averaging also holds. Thus, for the interpolation-based scenario, based on the above analysis, it has been found that excluding the desired term in the averaging process, i.e. applying the "Exia"-process, can improve the performance of the receiver circuit 100.

Extrinsic-Information-Averaging (Exia) Technique with Reference-Symbols

In this section we discuss the Extrinsic-information-averaging (Exia) technique with reference-symbols as an example (as applied by the Exia-channel-estimator 104) and a "stepping-stone" to the next-section where we discuss the Exia technique (in combination with interpolation) for the data-symbols (as applied by the Exia-noise-estimator 109).

The Exia-channel-estimator 104 applies Exia on the channel-estimates $\{\hat{H}_k[n]\}$ that are provided by the channel-estimator 103 based on the received reference-symbols $(r_k[n])$ (see also Eq. 11) in order to obtain better estimates of the channel-coefficients in a noisy-environment. This Exia-process with reference-symbols provides reliable channel-estimates $(X_k[n])$ at the output of the Exia-channel-estimator 104;

$$\hat{G}_k[n] \stackrel{def}{=} \qquad \text{Eq. 25}$$

$$\frac{1}{(N-1)} \sum_{\substack{i=n-\frac{N-1}{2} \\ i \neq n}}^{n+\frac{N-1}{2}} \frac{r_k[i] \cdot P_k^*[i]}{2} = \frac{1}{(N-1)} \sum_{\substack{i=n-\frac{N-1}{2} \\ i \neq n}}^{n+\frac{N-1}{2}} \hat{H}_k[i] = X_k[n],$$

$$n \in \mathbb{Z}$$
$$N > 1$$

Note that, in the summations, 'i≠n', and therefore Exia processing is applied. These channel-estimates $(X_k[n])$ are provided as an output signal from the channel-averaging-processing-block 104 of FIG. 5.

In this way, the channel-averaging-processing-block 104:
receives an OFDM signal that comprises a plurality of channel-estimate-sample-values $(\hat{H}_k[n])$, wherein the channel-estimate-sample-values comprise:
a middle-channel-estimate-sample value (n);
a lower-channel-estimate-sample-group (n−((N−1)/2) to n−1); and
a higher-channel-estimate-sample-group (n+1 to n+((N−1)/2)); and
determines an averaged-channel-estimate-sample-value $(X_k[n])$ for the middle-channel-estimate-sample (n) by performing an averaging operation on the sample-values of the lower-channel-estimate-sample-group and the higher-channel-estimate-sample-group, but not on the sample-value of the middle-channel-estimate-sample, such that the averaged-channel-estimate-sample-value $(X_k[n])$ is representative of channel-estimation-data $(X_{k+l}[n])$, which will be provided by the linear-interpolator 105.

The linear-interpolator 105 applies an equation that is similar to that of Eq. 22 to the channel-estimates $(X_k[n])$ that are provided by the channel-averaging-processing-block 104. In this way, the linear-interpolator 105 can interpolate between a plurality of averaged-channel-estimate-sample-values $(X_k[n])$ in order to determine the interpolated-channel-estimates $(X_{k+l}[n])$ (which can also be referred to as channel-estimation-data).

For illustrative purposes, equations 26 and 27 are shown to illustrate how noise-variance ($\widehat{VAR}_k^2[n]$) and channel-state-information ($\hat{C}_k[n]$) could be determined using reference-symbols. The processing of equations 26 and 27 is not performed by the receiver circuit 100 of FIG. 5 however because, as will be discussed below, "virtual-pilots" are used to determine noise-variance and channel-state-information.

If the Exia-process is applied on estimated noise-samples with reference-symbols in order to obtain a noise-variance ($\widehat{VAR}_k^2[n]$) with reference-symbols, this yields;

$$\widehat{VAR}_k^2[n] \stackrel{def}{=} \frac{1}{N-1} \sum_{\substack{i=n-\frac{N-1}{2} \\ i \neq n}}^{n+\frac{N-1}{2}} |r_k[i] - P_k[i] \cdot X_k[i]|^2, \qquad \text{Eq. 26}$$

$$n \in \mathbb{Z}$$
$$N > 1$$

Now, the channel-state-information for the $n^{th}$ sample with reference-symbols in the "Exia"-scenario is given by;

$$\hat{C}_k[n] = \frac{|\hat{G}_k[n]|^2}{\widehat{VAR}_k^2[n]} = \frac{(N-1) \cdot |X_k[n]|^2}{\sum_{\substack{i=n-\frac{N-1}{2} \\ i \neq n}}^{n+\frac{N-1}{2}} |r_k[i] - P_k[i] \cdot X_k[i]|^2}, \qquad \text{Eq. 27}$$

$$n \in \mathbb{Z}$$
$$N > 1$$

Note, that the channel-coefficients $\{X_k[j]\}$ (where 'j' is shown to represent an index variable) in the numerator and denominator are in the "Exia"-process obtained at neighbour-intervals, i.e., "extrinsic-information" for the desired signal. Now, with the "Exia"-process, Eq. 27 shows the more consistent result that by increasing N the CSI also might grow thanks to the factor (N−1) for N>1.

It has been found that the Exia processing described herein is particularly advantageous if the middle-sample-value corresponds to a pilot-sample-value, which includes a "virtual-pilot" sample-value as it is disclosed herein.

Extrinsic-Information-Averaging (Exia) Technique for Data-Symbols

In the next section we will discuss an optional newly-proposed method in which the data-symbols ($y_{k+l}[n]$) that are provided by the domain-converter 102 are used as (blind-mapped) virtual-pilots $\hat{D}_{k+l}[n]$. These virtual-pilots ($\hat{D}_{k+l}[n]$) are generated by a virtual-pilot-signal-generator 116 in FIG. 5. However for explaining the newly-proposed Exia technique for data-symbols, it is for now sufficient to know that these virtual-pilot symbols $\hat{D}_{k+l}[n]$ are available as input of the noise-estimator 108 of FIG. 5, such that the noise-estimator 108 can compute the noise-samples ($\hat{N}_{k+l}[n]$) for the data-symbols ($\hat{D}_{k+l}[n]$). This yields;

$$\hat{N}_{k+l}[n] = y_{k+l}[n] - \hat{D}_{k+l}[n] \cdot X_{k+l}[n], n \in \mathbb{Z} \qquad \text{Eq. 28}$$

These noise-samples ($\hat{N}_{k+l}[n]$) are provided as an output signal from the noise-estimator 108.

In this way, the noise-estimator 108 receives channel-estimation-data ($X_{k+l}[n]$); a plurality of N channel-estimated-data-sample-values ($\hat{D}_{k+l}[n]$); and an OFDM signal that comprises the plurality of N data-sample-values ($y_{k+l}[n]$). The noise-estimator 108 can then process the channel-estimation-data ($X_{k+l}[n]$); the channel-estimated-data-sample-values ($\hat{D}_{k+l}[n]$; and the N data-sample-values ($y_{k+l}[n]$) in order to determine a plurality of N noise-estimate-sample-values ($\hat{N}_{k+l}[n]$).

Obtaining the noise-variance ($\widehat{VAR}_{k+l}^2[n]$) for the data-symbols with the Exia-process applied on the estimated noise-samples where the virtual-pilots ($\hat{D}_{k+l}[n]$) act as the reference-symbols, yields;

$$\widehat{VAR}_{k+l}^2[n] \stackrel{def}{=} \frac{1}{N-1} \sum_{\substack{i=n-\frac{N-1}{2} \\ i \neq n}}^{n+\frac{N-1}{2}} |\hat{N}_{k+l}[i]|^2 = \qquad \text{Eq. 29}$$

$$\frac{1}{N-1} \sum_{\substack{i=n-\frac{N-1}{2} \\ i \neq n}}^{n+\frac{N-1}{2}} |y_{k+l}[i] - \hat{D}_{k+l}[i] \cdot X_{k+l}[i]|^2,$$

$$n \in \mathbb{Z}$$
$$N > 1$$

The noise-variance ($\widehat{VAR}_{k+l}^2[n]$) is provided as an output signal of the Exia-noise-estimator 109 in FIG. 5.

In this way, the Exia-noise-estimator 109 receives an OFDM signal that comprises a plurality of N noise-estimate-sample-values ($\hat{N}_{k+l}[n]$), wherein the N samples comprise: a middle-noise-estimate-sample (n); a lower-noise-estimate-sample-group (n−((N−1)/2) to n−1); and a higher-noise-estimate-sample-group (n+1 to n+((N−1)/2)). The Exia-noise-estimator 109 can then determine an averaged-noise-estimate-sample-value ($\widehat{VAR}_{k+l}^2[n]$) for the middle-noise-estimate-sample (n) by performing an averaging operation on the sample-values of the lower-noise-estimate-sample-group and the higher-noise-estimate-sample-group, but not on the sample-value of the middle-noise-estimate-sample.

Then the channel-state information of the data-symbols can be determined/estimated by the CSI-estimator 110 of FIG. 5, using the newly-proposed Exia-method for the data-symbols (and the virtual-pilots which act as reference-symbols), this yields;

$$\hat{C}_{k+l}[n] = \frac{|\hat{G}_{k+l}[n]|^2}{\widehat{VAR}_{k+l}^2[n]} \stackrel{def}{=} \qquad \text{Eq. 30}$$

$$\frac{|X_{k+l}[n]|^2}{\widehat{VAR}_{k+l}^2[n]} = \frac{(N-1) \cdot |(1-\alpha_l)X_k[n] + \alpha_l X_{k+L}[n]|^2}{\sum_{\substack{i=n-\frac{N-1}{2} \\ i \neq n}}^{n+\frac{N-1}{2}} |y_{k+l}[i] - \hat{D}_{k+l}[i] \cdot X_{k+l}[i]|^2},$$

$$l \in [1, 2, \ldots, L-1], \quad \begin{array}{l} n \in \mathbb{Z} \\ N > 1 \end{array}$$

where ($\hat{D}_{k+l}[i]$) represents "virtual-pilot" sample-values that are provided by the virtual-pilot-signal-generator 116. The channel-state information ($\hat{C}_{k+l}[n]$) is the output of the CSI-estimator 110.

Also here Eq. 30 shows the more consistent result that by increasing N the CSI also might increase due to the factor (N−1) for N>1. This is in contrast to non-Exia averaging, where increasing N seemingly decreased the value for the CSI.

In this way, the CSI-estimator 110 can process an averaged-channel-estimate-sample-value ($X_{k+l}[n]$) and an averaged-noise-estimate-sample ($\widehat{VAR}_{k+l}^2[n]$) in order to determine channel-state information ($\hat{C}_{k+l}[n]$).

Advanced-LLR-Computation (with "Exia") for Data-Symbols

Then, with the aid of linear interpolation by the linear-interpolator 105, the "Exia"-method based CSI-results ($\hat{C}_{k+l}[n]$) are applied by the LLR-calculator 111 to compute the LLRs of the data-symbols ($y_{k+l}[n]$) that were received as part of the input-OFDM-signal 112. Moreover, since for the QPSK-symbols the real and imaginary values represent bits to be decoded by, for example, a Viterbi-engine, the LLR-calculator 111 splits the ALLR computation into real and imaginary values: a first-output-LLR-signal $\hat{L}_{k+l}^I[n]$ 114a, and a second-output-LLR-signal $\hat{L}_{k+l}^Q[n]$ 114b, as can be seen at the output of the LLR-calculator 111. The ALLR for the real I-branch becomes;

$$\hat{L}_{k+l}^I[n] = \hat{C}_{k+l}[n] \cdot \Re\left\{\frac{y_{k+l}[n]}{\hat{G}_{k+l}[n]}\right\} = \qquad \text{Eq. 31}$$

$$((1-\alpha_l)\hat{C}_k[n] + \alpha_l \hat{C}_{k+L}[n]) \cdot \Re\left\{\frac{y_{k+l}[n]}{(1-\alpha_l)X_k[n] + \alpha_l X_{k+L}[n]}\right\},$$

$$l \in [1, 2, \ldots, L-1], \quad \begin{array}{l} n \in \mathbb{Z} \\ N > 1 \end{array}$$

and for the imaginary Q-branch;

$$\hat{L}_{k+l}^Q[n] = \hat{C}_{k+l}[n] \cdot \mathcal{I}\left\{\frac{y_{k+l}[n]}{\hat{G}_{k+l}[n]}\right\} = \qquad \text{Eq. 32}$$

$$((1-\alpha_l)\hat{C}_k[n] + \alpha_l \hat{C}_{k+L}[n]) \cdot \mathcal{I}\left\{\frac{y_{k+l}[n]}{(1-\alpha_l)X_k[n] + \alpha_l X_{k+L}[n]}\right\},$$

$$l \in [1, 2, \ldots, L-1], \quad \begin{array}{l} n \in \mathbb{Z} \\ N > 1 \end{array}$$

In this way the LLR-calculator 111 can process the channel-state information ($\hat{C}_{k+l}[n]$), the averaged-channel-estimate-sample-value ($X_{k+l}[n]$) and data-sample-values ($y_{k+l}[n]$) in order to determine an output-LLR-signal ($\hat{L}_{k+l}^I[n]$ and $\hat{L}_{k+l}^Q[n]$).

It is clear from the previous discussion that applying an average, which is only based on the neighbour symbols of the desired symbol, i.e., the "Exia"-method, improves the accuracy with which a received data-symbol can be decoded. Therefore, the "extrinsic information averaging"-process is another technique of improving the LLR-computation for an (H)IBOC-reception.

Data-Decision Directed Channel-State-Information (CSI) Computation

In this section we will introduce a technique that provides the above mentioned "virtual-pilots" $\{\hat{D}_{k+l}[n]\}$ based on the data-symbols ($y_{k+l}[n]$). The "virtual-pilots" $\{\hat{D}_{k+l}[n]\}$ are then used to compute the ALLRs. These "virtual-pilot" sample values will act as the pilot-symbols for the noise-variance estimations that are performed by the noise-estimator 108.

Moreover, we will elaborate in this section on the combination of our newly-proposed "Exia"-method with the "virtual-pilot" or data-decision directed scenario to estimate the CSI of the unknown QPSK data-symbols. This method of data-decision directed channel-state-information computation is a further algorithm to improve the LLR values used in an (H)IBOC-receiver.

The virtual-pilot-signal-generator 116 "blind-maps" the received QPSK data-symbols ($y_{k+l}[n]$) to their expected transmitted values based on the channel-estimation-data ($X_{k+k}[n]$) that is determined using the reference-symbols ($r_k[n]$) and the pilot symbols ($P_k[n]$) by the Exia-channel-estimator 104 and the linear-interpolator 105. In this example, because QPSK is used, the received QPSK data-symbols ($y_{k+l}[n]$) are blind-mapped to one of the following set of constellation-points $$[\sqrt{2}e^{j\frac{\pi}{4}}, \sqrt{2}e^{j3\frac{\pi}{4}}, \sqrt{2}e^{j5\frac{\pi}{4}}, \sqrt{2}e^{j7\frac{\pi}{4}}]$$

to act as pilot-symbols for the received QPSK data-symbols ($y_{k+l}[n]$), i.e., "virtual-pilot" sample values. Moreover, these "virtual-pilots" are based on the data-symbols and are obtained in a data-decision directed fashion, i.e., blind-mapping, which is mapping the received symbols to their "ideal" (QPSK) constellation-positions, e.g., the QPSK-symbol set $$\chi_{QPSK} = \{\sqrt{2}e^{jq\frac{\pi}{4}}, q = 1, 3, 5, 7\}.$$

The blind-mapping of the "Exia" equalized data-symbols to the QPSK-symbol set $\chi_{QPSK}$ might be shown by the following computations, i.e., equalization (divide the received-signal by the channel-estimate) and take the sign;

$$\hat{D}_{k+l}[n] \stackrel{def}{=} \text{sign}\left(\Re\left\{\frac{y_{k+l}[n]}{X_{k+l}[n]}\right\}\right) + i \cdot \text{sign}\left(\Im\left\{\frac{y_{k+l}[n]}{X_{k+l}[n]}\right\}\right), \quad \text{Eq. 33}$$

$l \in [1, 2, \ldots, L-1], n \in \mathbb{Z}$
with

-continued $$\text{sign}(y) = \begin{cases} +1, & \text{iff } y > 0 \\ 0, & \text{iff } y = 0 \\ -1, & \text{iff } y < 0 \end{cases} \quad \text{Eq. 34}$$

with iff $\stackrel{\text{def}}{=}$ "if and only if" and $y_{k+l}[n] = H_{k+l}[n] \cdot D_{k+l}[n] + \eta_{k+l}[n], l \in [1,2, \ldots, L-1], n \in \mathbb{Z}$  Eq. 35

The virtual-pilot-signal-generator 116 in this example includes a channel-equaliser 106 and a data-mapper 107 to perform this functionality.

The channel-equaliser 106 receives channel-estimation-data ($X_{k+l}[n]$) and an OFDM signal that comprises a plurality of N data-sample-values ($y_{k+l}[n]$). The channel-equaliser 106 divides the plurality of N data-sample-values ($y_{k+l}[n]$) by the channel-estimation-data ($X_{k+l}[n]$) as part of the processing for determining a plurality of N channel-estimated-data-sample-values ($\hat{D}_{k+l}[n]$) as represented by Eq. 33, and provides this quotient as an output signal for the data-mapper 107.

The data-mapper 107 then converts the output signal of the channel-equaliser 106 to the nearest one of a plurality of predetermined points of an associated shift keying map in order to determine a plurality of N channel-estimated-data-sample-values ($\hat{D}_{k+l}[n]$). As discussed above, in this example the predetermined points are the centre-points of the symbol-values in the QPSK constellation map, and therefore represent a perfectly accurate symbol-value. In this way, it is assumed that the application of the interpolated-channel-estimates ($X_{k+l}[n]$) to the plurality of N data-sample-values ($y_{k+l}[n]$) will result in a value that is in the correct region of the shift keying map. Therefore, a comparison between (i) the perfectly accurate symbol-value (as provided by the channel-estimated-data-sample-values ($\hat{D}_{k+l}[n]$); and (ii) the received data-sample-values ($y_{k+l}[n]$), can be used to determine the characteristics of noise that is experienced by the data-sample-values ($y_{k+l}[n]$)

As already indicated, the blind-mapped received-symbols or "virtual data-pilots" ($\hat{D}_{k+l}[n]$) are used to estimate the noise-variance ($\widehat{VAR}_{k+l}^2[n]$) and, consequently, the channel-state-information (CSI) ($\hat{C}_{k+l}[n]$). This "data-decision directed (DD) CSP" will be used to compute ALLRs for each of the coded-bits, as can be seen from the receiver circuit 100 in FIG. 5.

The newly-proposed DD-CSI computation for the unknown QPSK data-symbols with the application of the "Exia"-method, where the procedures for the data-symbols are represented by blocks 106-110 of the receiver circuit 100, and the linear-interpolation of the known reference-symbols with the application of Exia are represented by the blocks 103-105 of the receiver circuit 100, can be written as in Eq. 30.

Furthermore, the ALLR computations with the newly proposed DD-CSI approach for the real I-branch and for the imaginary Q-branch as are given by Eq. 31, respectively, Eq. 32 of the previous section and these computations are represented by the LLR-calculator 111 of the receiver circuit 100 of FIG. 5.

Comparison on a Stationary (AWGN)-Channel with Two Interference Signals

If we compare, just as an example, the conventional LLR described above with the advanced-LLR computation, which makes use of the newly-proposed techniques, it can be expected that the ALLRs should outperform the conventional LLRs in the presence of strong $1^{st}$-adjacent interference signals. If this is indeed the case then, the (H)IBOC-receiver with the newly-proposed techniques should require, for the same performance, a lower sensitivity than the conventional (H)IBOC-receiver, i.e., with the two-path CIC approach shown in FIG. 3, and without the newly-proposed techniques.

Figure 6:
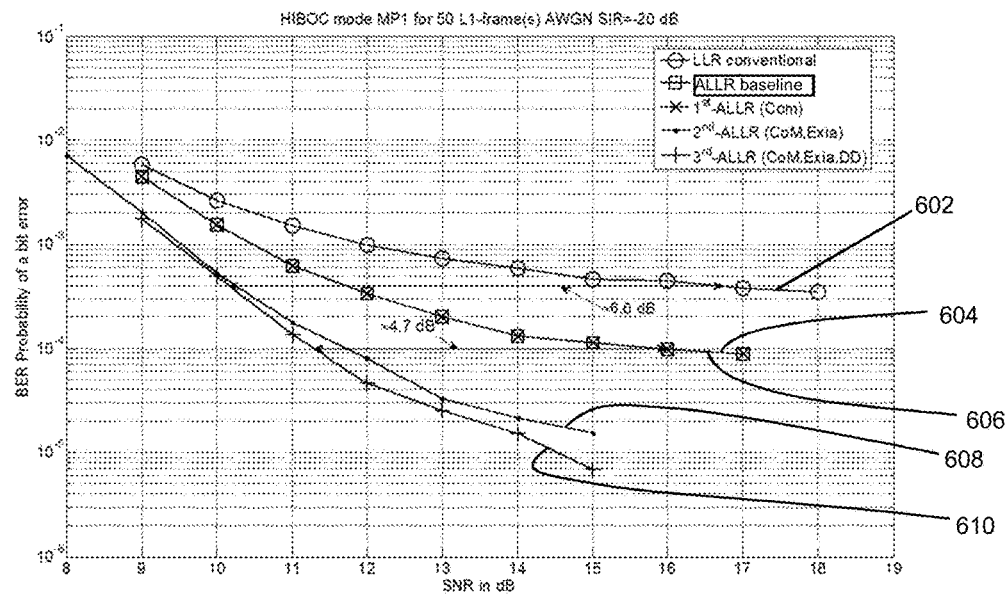
FIG. 6 shows graphically the performance improvements of various receiver circuits disclosed herein.

FIG. 6 shows, by way of simulation results, the BER-performances (bit error rate) of a conventional (H)IBOC receiver with conventional LLRs, compared against an (H)IBOC-receiver with the newly-proposed techniques, i.e., with the computation of the ALLRs, over a stationary (AWGN)-channel with two strong $1^{st}$-adjacent FM interference-signals (SIR=−20 dB).

FIG. 6 shows the following plots of BER versus SNR:
a first plot 602—conventional LLR processing;
a second plot 604—an ALLR baseline plot, for comparison with the third to fifth plots;
a third plot 606—use of an overlap-and-add-processor to perform center-of-mass (CoM) dependent overlap-and-add (OaA);
a fourth plot 608—use of an overlap-and-add-processor, and an averaging-processing-block of FIG. 4 to perform "Exia" processing; and
a fifth plot 610—use of an overlap-and-add-processor, "Exia" processing, and a virtual-pilot-signal-generator for determining data-decision directed channel-state-information (CSI) computation.

FIG. 6 shows that for the different stationary (AWGN) simulations with two interference signals with an SIR=−20 dB, the newly-proposed advanced-LLR computations to decode the CPPC-code (as illustrated by plot 610) show a sensitivity-gain of 6.6 dB, at (rather high) error-floor of BER≈4·10$^{-4}$, compared to a conventional LLR computations (two-path CIC based (H)IBOC-receiver, as shown by plot 602).

FIG. 6 shows how a distinction can be made between the three different improvement algorithms and shows what each of these algorithms adds to the total sensitivity gain.

The second plot 604 represents an ALLR baseline plot, It represents the performance of a system that performs additional processing (but not the ALLR processing that has been described with reference to FIG. 5) when compared with the conventional LLR processing. The nature of the additional processing is not relevant to the present disclosure, apart from to mention that it was also performed by the systems that were used to generate the third plot 606, the fourth plot 608 and the fifth plot 610.

The $1^{st}$-algorithm; Center-of-Mass (CoM) dependent Overlap-and-Add (OaA), which is represented by the third plot 606, provides results that are substantially the same as those of the second plot 604. In this example, the Center-of-Mass (CoM) dependent Overlap-and-Add (OaA) does not improve the sensitivity-gain when compared with the second plot 604 because for the AWGN-case, the (optimal) CoM-position is at the beginning of the OFDM-symbol (which is a default assumption for a conventional system) due to zero-multipath. However, if the noise were not AWGN, then the third plot 606 would show an improved performance over the second plot 604.

The $2^{nd}$-algorithm ("Exia"), which is represented by the fourth plot 608, shows, in this particular-case, a significant portion of the total sensitivity-gain, i.e., ≈4.2 dB out of the ≈4.7 dB when compared with the third plot 606. Thus, exclusion of the pilot in the averaging-process brings quite some gain in the stationary AWGN-case with two strong adjacent interference signals.

The $3^{rd}$-algorithm (DD), which is represented by the fifth plot 610, shows a sensitivity-gain of ≈0.5 dB at a moderate BER=10$^{-4}$. However, what is quite important here is that the error-floor is reduced by the newly-proposed techniques and therefore the gains become quite significant especially by low error-probabilities. This has also been confirmed by simulation-results for different scenarios, e.g., time-varying channels with small $1^{st}$-adjacent FM interferences-signals.

Note, the SNR sensitivity-values, i.e., the x-axis, shown by FIG. 6 are based on the digital-signal processing that is modeled in the simulator, e.g., the isolation-filters are based on a suppression that looks to meet the overall BER-performances of a conventional (H)IBOC-receiver.

Therefore, FIG. 6 shows that each of the three newly-proposed algorithms;
1) "Center-of-Mass (CoM) dependent Overlap-and-Add (Oa, as performed by an overlap-and-add-processor,
2) "Extrinsic information averaging (Exia)" as performed by an Exia-channel-estimator and an Exia-noise-estimator, and
3) "Data-decision directed (DD) Channel-State-Information (CSI)", which includes processing by a virtual-pilot-signal-generator,
can improve the LLR-computation and, consequently, the sensitivity, i.e., a lower probability of a bit error (BER) with the same signal-to-noise ratio (SNR), of an (H)IBOC-receiver. Although for the theoretical simulations of FIG. 6, which are based on AWGN with no multipath, the CoM-dependent OaA does not provide an improvement.

Advantageously, the newly-proposed algorithms can only use information of the physical-layer (PHY) and may do not use information from the higher-layers. In addition, the newly-proposed algorithms may not use iterative-techniques based on reuse of the decoded information. By not requiring use of information of the higher-layers or of iterative-techniques, the complexity of a receiver circuit as disclosed herein can be kept significantly lower compared to methods that use these higher-layers or iterative techniques.

Although the above discussion mainly relates to QPSK, it will be appreciated that digital modulation schemes can be used, including other types of phase shift keying. Also, any degree of quadrature amplitude modulation (QAM) can be used. Furthermore, in some examples, the signals may not be OFDM signals.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A receiver circuit comprising:
  an Orthogonal Frequency Division Multiplexing (OFDM) receiver configured to receive an OFDM signal that comprises a plurality of sample-values, wherein the plurality of sample-values comprise a middle-sample-value, a lower-sample-value-group received earlier in time than the middle-sample-value, a higher-sample-value-group received later in time than the middle-sample-value, and determine an averaged-sample-value for the middle-sample-value by performing an extrinsic information averaging operation on the sample-values of the lower-sample-value-group and the higher-sample-value-group, but not on the middle-sample-value.

2. The receiver circuit of claim 1, wherein the sample values comprise channel-estimate-sample-values that are representative of an estimate for the transfer function of the channel for each received sample.

3. The receiver circuit of claim 1, wherein the middle-sample-value corresponds to a known pilot-sample-value.

4. The receiver circuit of claim 1, wherein the OFDM receiver further comprises:
  an Extrinsic information averaging (Exia) channel estimator configured to receive the OFDM signal that comprises a plurality of channel-estimate-sample-values, wherein the channel-estimate-sample-values comprise a middle-channel-estimate-sample, a lower-channel-estimate-sample-group, and a higher-channel-estimate-sample-group, and determine an averaged-channel-estimate-sample-value for the middle-channel-estimate-sample by performing an averaging operation on the sample-values of the lower-channel-estimate-sample-group and the higher-channel-estimate-sample-group, but not on the sample-value of the middle-channel-estimate-sample, wherein the averaged-channel-estimate-sample-value is representative of channel-estimation-data.

5. The receiver circuit of claim 4, further comprising:
  a linear-interpolator configured to interpolate between a plurality of averaged-channel-estimate-sample-values in order to determine the channel-estimation-data.

6. The receiver circuit of claim 4, further comprising:
  a channel-estimator configured to receive the OFDM signal that comprises a plurality of reference-sample-values, receive the OFDM signal that comprises a plurality of pilot-sample-values, wherein the pilot-sample-values correspond to the received reference-sample-values, and process the pilot-sample-values and the received reference-sample-values in order to determine the plurality of channel-estimate-sample-values.

7. The receiver circuit of claim 6, wherein the OFDM receiver further comprises:
  an Extrinsic information averaging (Exia) noise estimator configured to receive the OFDM signal that comprises a plurality of noise-estimate-sample-values, wherein the noise-estimate-sample-values comprise a middle-noise-estimate-sample, a lower-noise-estimate-sample-group, and a higher-noise-estimate-sample-group, and determine an averaged-noise-estimate-sample for the middle-noise-estimate-sample by performing an averaging operation on the sample-values of the lower-noise-estimate-sample-group and the higher-noise-estimate-sample-group, but not on the sample-value of the middle-noise-estimate-sample.

8. The receiver circuit of claim 7, further comprising:
  a virtual-pilot-signal-generator configured to receive channel-estimation-data, receive the OFDM signal that comprises a plurality of data-sample-values and divide the plurality of data-sample-values by the channel-estimation-data in order to determine a plurality of channel-estimated-data-sample-values; and
  a noise-estimator configured to receive the channel-estimation-data, receive the plurality of channel-estimated-data-sample-values, receive the OFDM signal that comprises the plurality of data-sample-values, and process the channel-estimation-data, the plurality of channel-estimated-data-sample-values, and the OFDM signal that comprises the plurality of data-sample-values in order to determine the plurality of noise-estimate-sample-values for the Exia noise estimator.

9. The receiver circuit of claim 8, wherein the virtual-pilot-signal-generator is configured to divide the plurality of data-sample-values by the channel-estimation-data, and then convert the results of the division to the nearest one of a plurality of predetermined points of an associated shift keying map in order to determine the plurality of channel-estimated-data-sample-values.

10. The receiver circuit of claim 8, further comprising:
  an overlap-and-add-processor configured to receive the OFDM signal comprising a plurality of time-domain-samples, determine a center-of-mass of the plurality of time-domain-samples, perform an overlap-and-add operation on the OFDM signal based on the determined center-of-mass in order to provide a processed-OFDM-signal comprising a plurality of processed-time-domain-samples; and a domain-converter configured to convert the plurality of processed-time-domain-samples into: (a) the plurality of reference-sample-values and (b) the plurality of data-sample-values in the frequency domain.

11. The receiver circuit of claim 10, wherein the overlap-and-add-processor is configured to perform an overlap-and-add operation by setting an OaA-cut-off based on the determined center-of-mass, which defines a boundary within guard samples between a first set of guard samples and a second set of guard samples, and copying the sample-values of the first set of guard samples to the sample-values of the second set of guard samples.

12. The receiver circuit of claim 7, further comprising:
a CSI-estimator configured to process the averaged-channel-estimate-sample-value and the averaged-noise-estimate-sample in order to determine channel-state information.

13. The receiver circuit of claim 12, further comprising:
an LLR-calculator configured to process the channel-state information, the averaged-channel-estimate-sample-value and data-sample-values in order to determine an output-LLR-signal.

14. A method of processing an OFDM signal, wherein the OFDM signal comprises a plurality of sample-values, wherein the sample-values comprise: a middle-sample-value, a lower-sample-value-group received earlier in time than the middle-sample-value, and a higher-sample-value-group received later in time than the middle-sample-value, the method comprising:

determining an averaged-sample-value for the middle-sample-value by performing an extrinsic information averaging operation on the sample-values of the lower-sample-value-group and the higher-sample-value-group, but not on the middle-sample-value; and using the averaged-sample-value for at least one of demodulation and decoding of the OFDM signal.

15. A car radio receiver system comprising the receiver circuit of claim 1.

16. The receiver circuit of claim 1, wherein the lower-sample-value-group and the higher-sample-value-group contain the same number of sample values.

17. The receiver circuit of claim 1, wherein the sample values comprise noise-estimate-sample-values that are representative of an estimate for a noise signal that is present in each sample.

* * * * *